Sept. 14, 1926.  
J. F. CALDWELL  
MOLDING MACHINE  
Filed Dec. 22, 1924  2 Sheets-Sheet 1
1,599,873
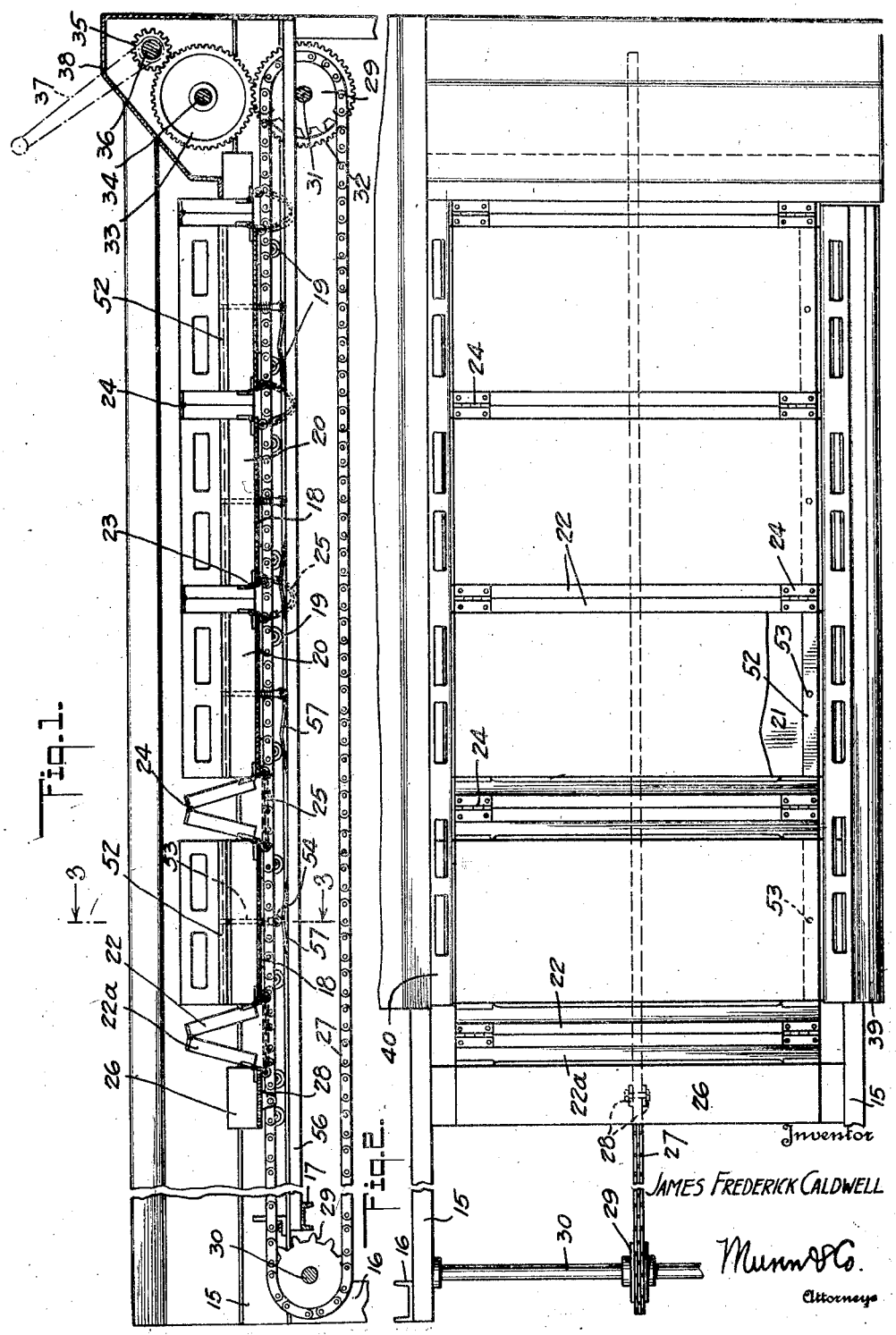
Inventor
JAMES FREDERICK CALDWELL
Munn & Co.
Attorneys

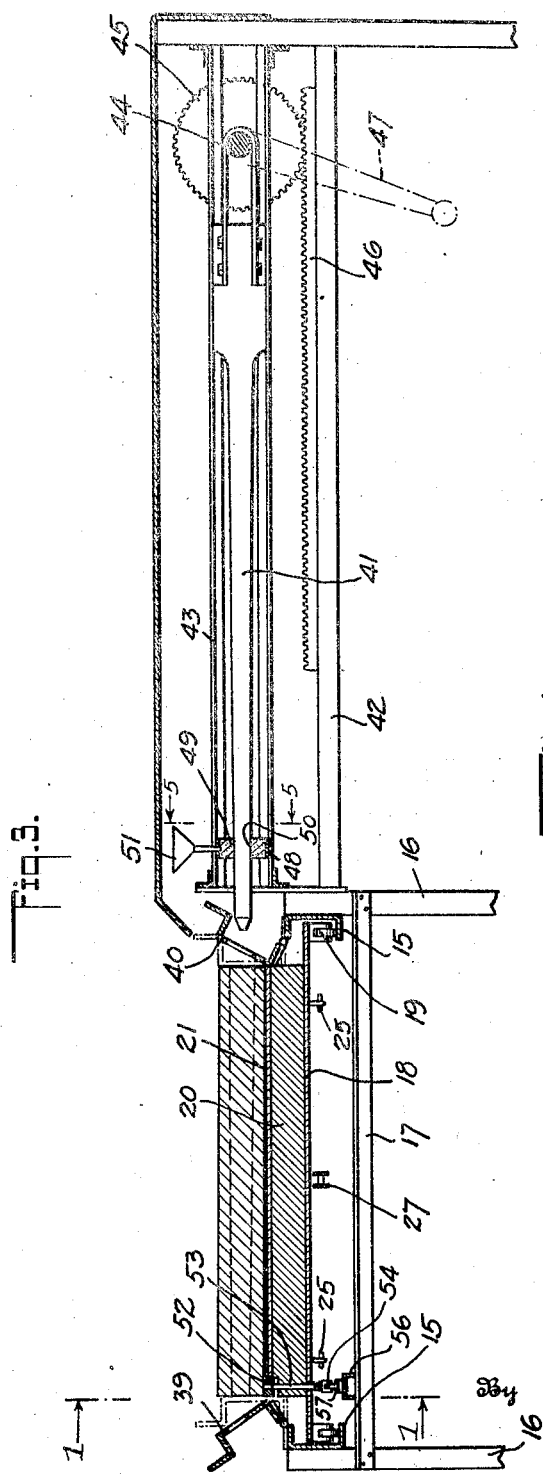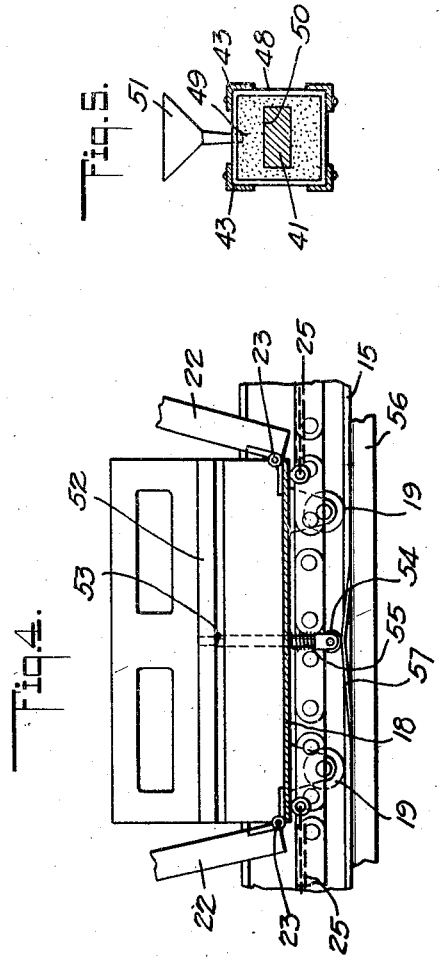

Patented Sept. 14, 1926.

1,599,873

UNITED STATES PATENT OFFICE.

JAMES FREDERICK CALDWELL, OF LOS ANGELES, CALIFORNIA.

MOLDING MACHINE.

Application filed December 22, 1924. Serial No. 757,525.

My invention relates to plastic molding machines of the character embodied in my Patent No. 1,481,686, issued January 22, 1924, wherein a plurality of collapsible molds are provided, and mechanism common to all of the molds for collapsing the same following a molding operation to facilitate removal of the molded articles, and for returning the mold to set up position for a subsequent molding operation.

Each mold includes side partitions hingedly connected to those adjacent molds and occupying positions perpendicular to the bottom partitions when the molds are set up. but capable of moving to substantially horizontal positions when the molds are moved to collapsed position.

It is a purpose of my invention to provide a plastic molding machine of the above described character having means by which the side partitions are prevented from collapsing to sub-horizontal position for the object of eliminating the additional length required in the machine to allow for such movement of the partitions of all of the molds, and the removal of all strain or stress to which they have been subjected.

It is also a purpose of my invention to provide in a molding machine means for automatically elevating the molded articles to free them from possible adhesion to the bottoms of the molds so that when the side and end partitions are in collapsed position, the molded articles can be easily removed intact from the molds.

Another purpose of my invention is the provision of a molding machine having cores operating in conjunction with the molds to form hollow blocks, there being means for lubricating the cores to prevent the plastic material from adhering to the cores and thereby facilitating removal of the latter from the blocks.

I will describe only one form of molding machine embodying my invention and will then point out the novel features thereof in claims.

In the accompanying drawings,

Figure 1 is a vertical sectional view taken on the line 1—1 of Figure 3;

Figure 2 is a view showing in top plan the machine shown in Figure 1 with portions thereof broken away;

Figure 3 is a transverse sectional view taken on the line 3—3 of Figure 1;

Figure 4 is an enlarged fragmentary view of one of the molds as shown in Figure 1;

Figure 5 is a vertical sectional view taken on the line 5—5 of Figure 3.

Similar reference characters refer to similar parts in each of the views.

Referring specifically to the drawings, my invention, in its present embodiment, comprises a pair of parallel spaced rails 15 supported in elevated position by means of uprights or legs 16 rigidly connected to the rails and to each other by cross rails 17. The two rails 15, as clearly illustrated in Figure 3, are U-shaped in cross section and co-operate to provide a track over which a plurality of molds are adapted to move.

As clearly shown in Figure 1, the several molds are arranged one in advance of the other above the track, and as shown in Figures 3 and 4 each mold includes a base plate 18 formed of metal or other suitable material carrying rollers 19 which rest upon the lower flanges of the rail 15 so as to support the base plate for movement on the track. Superimposed on the base plate 18 is a block 20, while superimposed on the latter is a protecting sheet or plate 21, the block and plate co-operating to provide the bottom partition of the mold. The sides of the mold are made up of two relatively thick partitions 22 pivotally supported on the base plate 18 by means of hinges 23, the mounting of the partitions being such that they can occupy a position perpendicular with respect to the base plate, which position is termed the "set up" position, and an inclined position, which position is termed the "collapsed" position. In the set up position, the side partitions co-operate with the other parts of the mold to receive and mold the plastic material into the article to be formed, while in the collapsed position they permit the removal of the molded article from the mold.

As shown in Figure 1, the side partitions 22 of any two adjacent molds are pivotally connected at their upper ends by means of hinges 24, so that when one mold is moved in a direction away from the other mold the adjacent partitions will move to collapsed position. In order to prevent these partitions from collapsing beyond the inclined position shown in Figure 1 and to thereby lessen the length of the entire machine required to accommodate a given number of molds, flexible elements 25, which elements are in the form of chains, connect the confronting ends of the base plates 18 of any two adjacent molds. The length of these elements is such that they are pulled taut when the side partitions 22 are in inclined or collapsed position, thus preventing further separation of adjacent molds. The flexible elements also serve to relieve the hinges 23 and 24 of any strain or stress, as it will be understood that in the separated position of adjacent molds all pull is exerted on the elements and not on the hinges.

By reference to Figure 1, it will be seen that the foremost or leading mold is operatively connected to an actuating block 26, and through the medium of its side partition 22 and a similar partition 22ª hingedly connected thereto and also to the block 26. Other flexible elements 25 connect the block with the base plate 18 of the foremost mold, so that when the block is advanced, that is, moved to the left from the position shown in Figure 1, the leading partition 22 will be moved to collapsed position, and upon continued movement of the block the entire mold will be advanced to effect the movement of the rear side partition 22 to collapsed position. It will be understood that by continuing the advancement of the block 26 the movement of the partitions of the other molds to collapsed position will occur successively.

The block 26 is advanced through a mechanism which comprises in the present instance a pair of endless chains 27, to which the block is secured by means of ears 28. These chains are trained around sprockets 29 fixed to shafts 30 and 31, the latter shaft having fixed thereto a gear 32 meshing with a similar gear 33 fixed to a shaft 34. The shaft 34, in turn, is driven by a pinion 35 fixed to a shaft 36 operated by a crank 37. A housing 38 encloses the several gears to protect the latter, as will be understood.

The several molds also include end partitions 39 and 40, and these partitions are common to all of the molds. As shown in Figure 3, they are supported for pivotal movement on the rails 15 to occupy set up or collapsed position, and for the purpose of accommodating cores 41 they are formed with openings through which the cores are adapted to slide, it being understood that the openings of one end partition register with those of the other partition. In the present instance, I have shown two cores 41 for each of the molds, and these cores are mounted for sliding movement in a frame 42, including guides 43, and the several cores are connected to a shaft 44 to which latter is fixed a gear 45 meshing with a rack bar 46. By means of a crank 47, the gear 45 can be rotated over the rack bar 46 to advance the cores through the openings of the end partitions 39 and 40, and to withdraw the cores from the molds subsequent to the molding of the plastic material. It is to be understood that the cores are to be used in the formation of hollow blocks or tiles.

To prevent the plastic material from adhering to the surfaces of the cores and to facilitate the withdrawal of the cores from the material, I have provided lubricating elements, one for each of the cores. Each lubricating element, as shown in Figure 5, includes a frame 48 secured to the guides 43 and surrounding a body of absorbent material 49 having a central opening 50, through which the core is adapted to extend. By means of a funnel 51, oil or other suitable lubricant can be supplied to the absorbent body 49, and as the latter is in contact with the core it will be clear that during movement of the core it will have wiping engagement with the body so as to distribute the lubricant over the surfaces of the core. It will be evident that with a thin film of lubricant interposed between the plastic material and the core that the adhesion of the material to the core is prevented.

For preventing adhesion between the bottom plate 20 of each mold and the plastic material and to thus facilitate the removal of the molded article from the mold, I have provided for each mold means which is automatically operable to slightly elevate the plastic material after the latter has set. This means in the present instance comprises a bar 52 (Figures 2 and 3) normally reposing within a recess formed along one edge of the block 20. A rod 53 is secured at its upper end to the bar and is mounted for vertical sliding movement within a suitable opening formed in the block 20. The lower end of the rod is provided with a roller 54, and a spring 55 is interposed between the roller and the base plate 18 for normally urging the rod downwardly and the bar 52 to a position flush with the plate 21. A rail 56 is supported on the cross bars 17 to extend longitudinally of the machine and beneath the several base plates 18. Secured at intervals along the length of the rail 56 are anticlinal cams 57, one for each of the rollers 54. As clearly shown in Figure 4, the corresponding cam 57 is arranged to be engaged by the roller during movement of the mold longitudinally of the machine, whereby the rod 53 is forced upwardly against the tension of the spring 55 to move the bar 52 to the elevated position shown in Figure 3. With the body of set plastic material reposing on the plate 21, it will be clear that with upward movement of the bar the body will be elevated at one end sufficiently to loosen the material with respect to the plate 21, so that when the mold is moved to collapsed position the molded article can be readily removed from the mold. It is to be particularly noted that the spacing of the several cams 57 is irregular for the reason that the power necessary to operate the machine will be reduced if the operations of the bars 52 occur at different times rather than simultaneously.

Assuming that the machine has been actuated to move the several molds to collapsed position and the bars 52 to elevated position, and the cores 41 removed from the molded articles, it will be clear that by reversing the operation of the machine the several molds will be returned to set up position, and the bars 52 to lowered position.

It is to be particularly noted that in the set up position of the side partitions 22 the hinges 24 are flush with the upper surfaces defined by the molds so that the plastic material introduced into the molds can be leveled off by a single scraping operation.

Although I have here shown and described only one form of molding machine embodying my invention, it is to be understood that various changes and modifications may be made therein without departing from the spirit of the invention and the spirit and scope of the appended claims.

I claim as my invention:

1. A molding machine comprising a plurality of molds arranged one in advance of the other and mounted for movement to occupy one extreme position in which they are set up and a second extreme position in which they are collapsed, mechanism by which the molds can be moved to either extreme position, each of the molds including movable partitions operatively connected to the movable partitions of adjacent molds to normally occupy a set up position and to be moved to a collapsed position when the leading mold is advanced sufficiently to exert a pull on the mold next in the rear, and means connecting adjacent molds for limiting the collapsed position of the partitions to facilitate their return to set up position.

2. A molding machine as embodied in claim 1 wherein the connecting means operates to relieve the partitions and their connections of any strain.

3. A molding machine as embodied in claim 1 wherein the connecting means comprises flexible elements.

4. In a molding machine, a movable mold, means movable in the mold for slightly elevating one end only of a body of plastic material in the mold to overcome adhesion thereto, and means for actuating the elevating means when the mold is moved.

5. In a molding machine comprising a plurality of movable molds, means movable in the molds for slightly elevating one end only of a body of plastic material in the molds to overcome adhesion thereto, means for urging the elevating means to a non-elevating position, stationary elements, and means engaging the stationary elements and connected to the first mentioned means for elevating the plastic body when the molds are moved.

6. In a molding machine, a mold mounted for movement, a member carried by the mold and being movable to slightly elevate one end only of the plastic material within the mold to overcome adhesion of the material thereto, and means for actuating the member when the mold is moved.

7. In a molding machine, a mold mounted for movement, a member movable in the mold to engage and lift one end of a body of plastic material in the mold, means for urging the member to a non-elevating position, a stationary cam, and a second member engaging the cam and connected to the first member for elevating the plastic body when the mold is moved.

8. A molding machine comprising a plurality of molds arranged one in advance of the other and mounted for movement to occupy one extreme position in which they are set up and a second extreme position in which they are collapsed, mechanism by which the molds can be moved to either extreme position, each of the molds including movable partitions operatively connected to the movable partitions of adjacent molds to normally occupy a set up position and to be moved to a collapsed position when the leading mold is advanced sufficiently to exert a pull on the mold next in the rear, means connecting adjacent molds for limiting the collapsed position of the partitions, a member movable to elevate set plastic material within each of the molds sufficiently to overcome adhesion thereof to the bottom of the molds, and means operable by movement of the mold for actuating said member.

9. In a molding machine, a plurality of molds mounted for movement, members carried by the molds movable to slightly elevate one end only of the set plastic material within the mold, to overcome adhesion of the material thereto, and stationary cams for actuating the members when the molds are moved, said means being arranged to effect actuation of the members at different times.

10. In a molding machine, a movable mold, means for slightly elevating one end only of a body of plastic material contained therein to overcome the adhesion of the plastic material to the mold and stationary means for actuating the elevating means when the mold is moved.

11. A molding machine comprising a track, a plurality of molds mounted for movement along the track, each of the molds including side and end partitions capable of occupying set up or collapsed positions, the side partitions of adjacent molds being hingedly connected to their respective molds and to each other, flexible members connecting adjacent molds, in a manner to limit the collapsed position of the side partitions, bars mounted for vertical movement within the molds, rods connected to the bars, means for urging the rods downwardly, and stationary cams adapted to be engaged by the rods for elevating the bars against the action of said urging means.

12. A molding machine as embodied in claim 11 wherein the cams are of anticlinal form.

JAMES FREDERICK CALDWELL.